June 26, 1956  J. G. COHEN  2,751,690
EDUCATIONAL DEVICE FOR TEACHING MATHEMATICS
BY OVERLYING TRANSPARENCIES
Filed Dec. 11, 1952  2 Sheets-Sheet 1

Julius G. Cohen
INVENTOR.

June 26, 1956 J. G. COHEN 2,751,690
EDUCATIONAL DEVICE FOR TEACHING MATHEMATICS
BY OVERLYING TRANSPARENCIES
Filed Dec. 11, 1952 2 Sheets-Sheet 2

Julius G. Cohen
INVENTOR.

United States Patent Office 2,751,690
Patented June 26, 1956

2,751,690

EDUCATIONAL DEVICE FOR TEACHING MATHEMATICS BY OVERLYING TRANSPARENCIES

Julius G. Cohen, Jefferson, Mo.

Application December 11, 1952, Serial No. 325,379

1 Claim. (Cl. 35—31)

This invention relates in general to educational devices and more specifically to a device for facilitating the teaching of students in mathematics.

The normal manner of teaching students different types of problems in mathematics is to illustrate sample problems in a textbook and for an instructor to follow up the textbook instructions by working sample problems on the blackboard or the like. However, the presentation of a sample problem in a textbook is such that an entire problem is worked out without the student having the possibility of visualizing the actual steps of working of the problem. Furthermore, it is necessary that a student read the instructions accompanying such an illustration of a problem and this requires the referring back and forward from the sample problem and the descriptive literature.

Also, while the instructor normally would work out the problem, step by step, on a blackboard, a student is unable to retain all of the details of these steps after the problem has been erased. Therefore, it is highly desirable to provide an improved means of teaching problems in mathematics.

The primary object of this invention is to provide an improved educational device which may be utilized in the instructing of students in mathematics, said educational device disclosing, step by step, the exact manner in which a sample mathematical problem may be solved.

Another object of this invention is to provide an improved educational device which may be utilized by a student independent of an instructor for learning the steps of working a sample problem in mathematics, said educational device being in the form of a booklet having the steps of the problem disposed on adjacent pages.

A further object of this invention is to provide an improved educational device for teaching problems in mathematics, said educational device being in the form of a booklet having the steps in the solution of a mathematic problem sequentially disposed on pages thereof, the pages being transparent whereby the individual steps are preformed by turning the pages of the booklet so that eventually the entire solution of the problem appears in one place.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
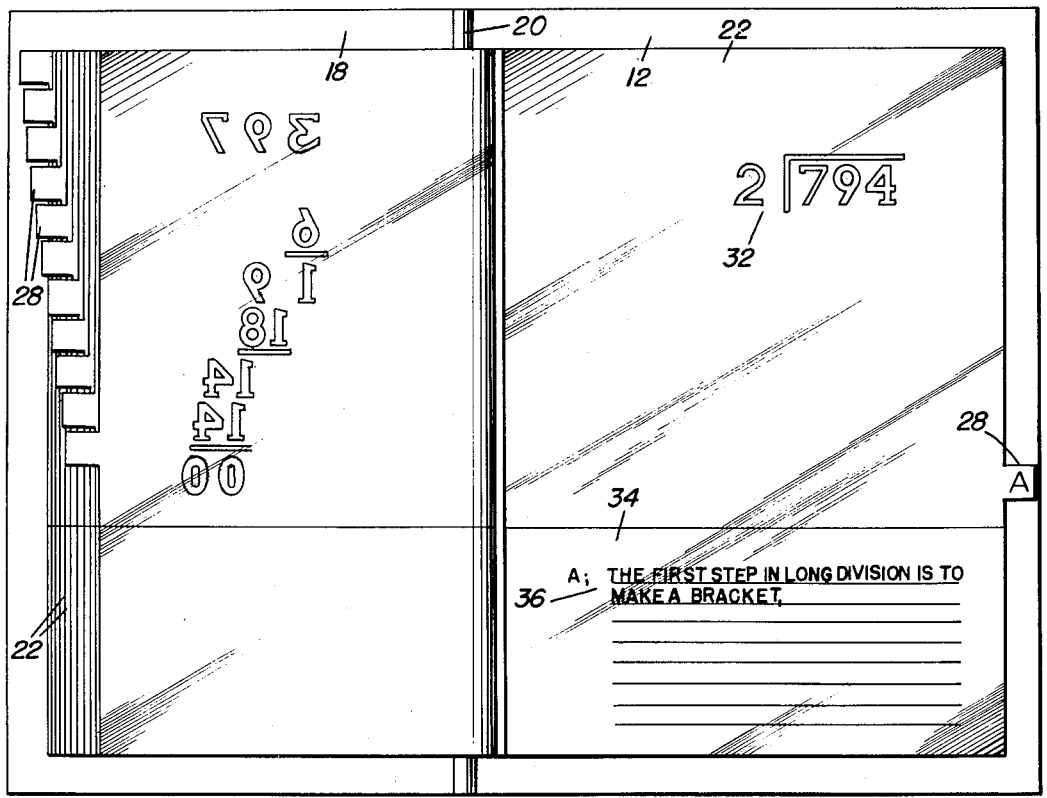
Figure 1 is a top plan view of the educational device, which is the subject of this invention, and shows the same in an open position, the first step in a solution of a problem being illustrated.
Figure 5:
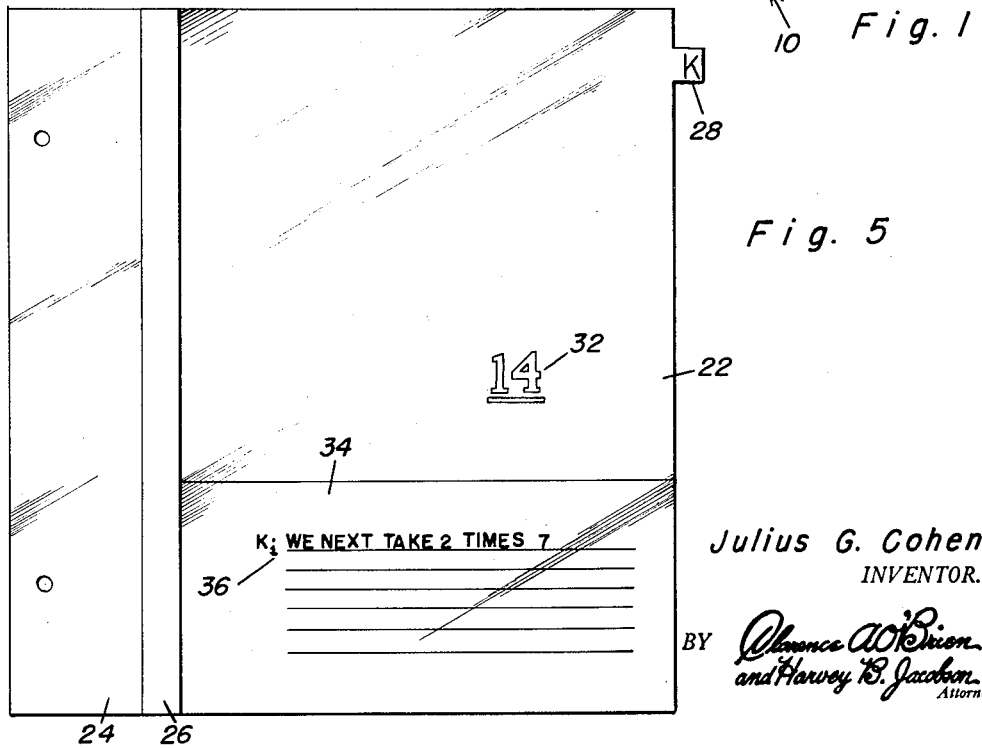

Referring now to the drawings in detail, it will be seen that there is illustrated an educational device conforming to the spirit of this invention which is utilized for the solving of a simple problem in long division. The educational device is in the form of a booklet which is referred to in general by the reference numeral 10. The booklet 10 includes a one-piece rear cover 12 and a two-piece front cover 14, the front cover including an attaching portion 16 and a hinged flap 18, the hinged flap 18 being usually secured to the attaching portion 16 by flexible strips 20 disposed on opposite sides thereof.

The booklet 10 also includes a plurality of pages 22 which underlie the hinged flap 18 and are hingedly connected to attaching portions 24. The attaching portions 24, like the attaching portion 16, are usually connected to the pages 22 by flexible strips 26. The pages 22 are also provided at their outer edges with offset tabs 28 to facilitate the turning of the same as well as identifying the individual pages 22.

It will be understood that the solution of only one problem will normally be disposed in a single booklet 10 although several solutions of problems could possibly be disposed in a single booklet. In order that the pages 22 and their associated attaching portions 24 may be conveniently replaced, the attaching portion 16 of the front cover, the attaching portions 24 of the pages 22 and an associated portion of the rear cover 12 are secured together by a detachable two-piece fastener 30.

Referring now to Figure 1 in particular, it will be seen that there is illustrated the booklet 10 open to a first step in the solution of a simple problem in long division. The first page 22, which is disposed at the right of the booklet when open, has mounted thereon in the form of decals indicia 32. The indicia 32 are near the top of the sheet and are disposed in the normal position for the solving of a problem in long division. At the bottom of the sheet 22, which is transparent, is an overlying sheet 34 which has imprinted thereon indicia 36 describing the problem to be solved and the initial step thereof. It will be also noted that the sheet having disposed thereon the first step in the problem is identified by the letter A imprinted upon the tab 28 thereof.

It will be understood that the additional sheets 22 of the booklet 10 are quite similar to the sheet 22 illustrated in Figure 1 and have mounted thereon other indicia 32 in the form of decals which are in the form of additional steps in the solution of the problem illustrated on the sheet of Figure 1. It will be understood that the additional sheets also include overlying sheets 34 which have imprinted thereon other indicia 36 which clearly describe the step in the solution of the problem illustrated thereon.

Figure 2:
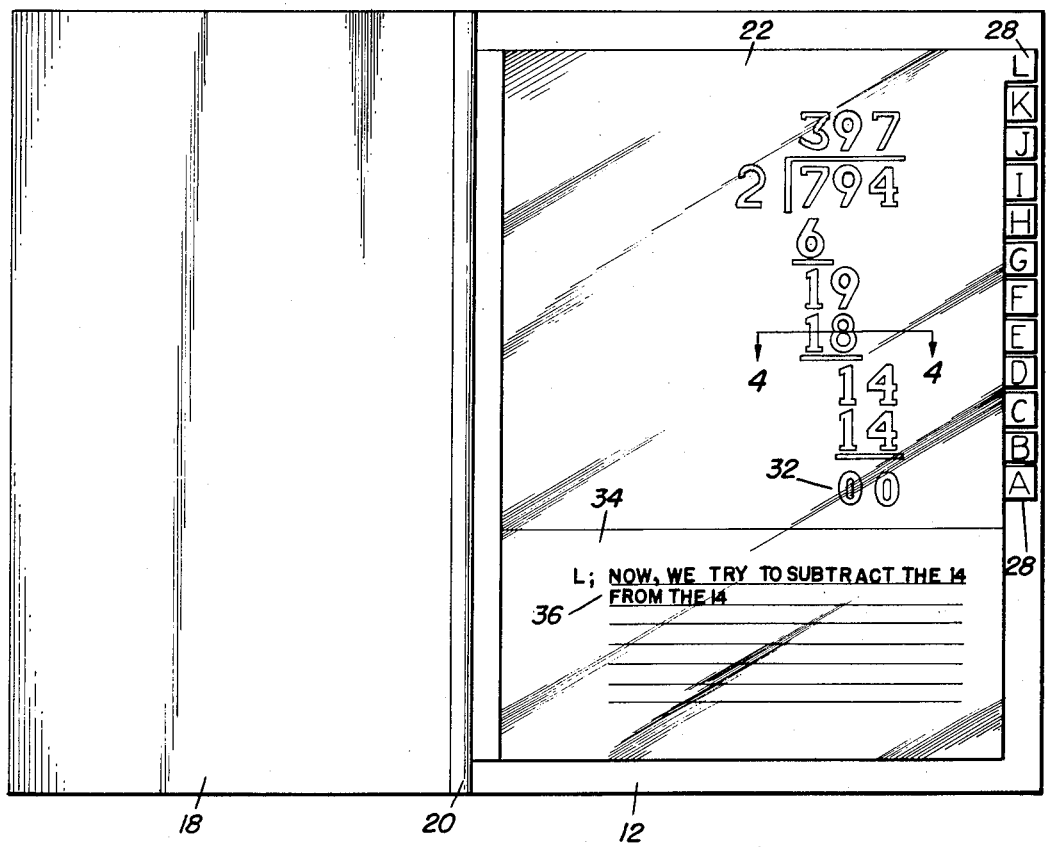
Figure 2 is a top plan view of the educational device of Figure 1 and shows the same with the illustration of a completed problem.
Figure 4:
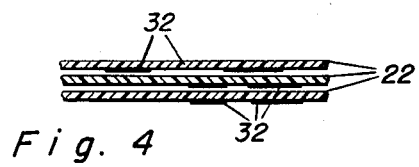
Figure 4 is an enlarged fragmentary transverse sectional view taken substantially upon the plane indicated by the section line 4—4 of Figure 2 and shows the general construction of pages of the educational device, only several of the pages being illustrated; and, Figure 5 is a top plan view of a single page of the educational device and shows the general construction and arrangement of the same.
Figure 3:
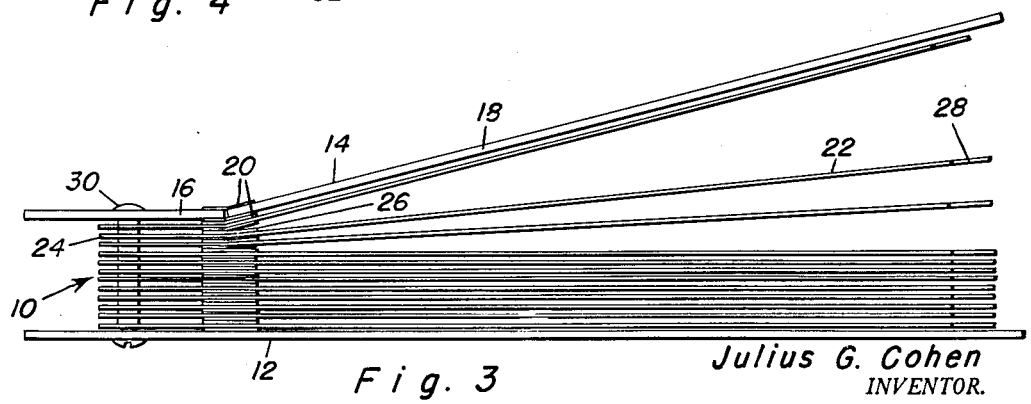
Figure 3 is an enlarged front elevational view of the educational device of Figure 1 pages thereof being in the process of being turned.

Referring now to Figure 2 in particular, it will be seen that the last sheet 22 has been turned and that the completed problem appears to the student utilizing the booklet 10. It will be seen that by making the sheets 22 of a transparent material as the solution of the problem progresses each additional step of the problem is added in the same manner as one would with a pencil on a piece of paper or with chalk on a blackboard in the working of such a problem. In this manner, not only does the student become fully aware of the additional step in the solution of the problem, but he also has the incompleted problem before him so as to understand the purpose of the additional step. It will be seen that the steps in the solution of the problem is so set forth that a student will quickly and easily grasp the purpose of each step and therefore will know how to solve other similar problems.

While the mathematic problem illustrated in the drawings has been limited to the department of long division, it will be understood that the invention is not intended to be so limited. The problems which may be taught in the manner suggested may range from simple addition problems to problems in algebra and calculus or other higher mathematics.

Also, while each sheet has been illustrated and described as having the problems formed thereon in the form of decals and the description of the steps of the problems in the form of overlying sheets, it will be understood that the problems and the description of the steps may be formed on the transparent sheets 22 in any desired manner without varying the spirit of this invention.

The educational device, which is the subject of this invention, permits an easier, less confusing, time saving method of presentation of mathematical problems in which a minimum amount of descriptive matter is required. Also, the educational device presents an ideal method of instructing the solution of problems which involve the preparations of graphs. The present textbook method of teaching makes it difficult to teach the solution of such problems as the mechanical limitations of textbook constructions require that the steps of solving a problem be separated and that a person reading a textbook must constantly refer back and forth from an illustration of a problem and its associated descriptive matter. It will therefore be seen that the present invention provides a method of presentation which is decidedly advantageous over the textbook method.

Having thus described my invention in rather complete detail, it will be understood that these details need not be strictly adhered to, but that various changes and modifications will suggest themselves to one skilled in the art, all falling within the scope of the invention as defined in the appended claim.

What is claimed as new is as follows:

An educational device comprising a plurality of transparent sheets, indicia and mathematical symbols on each sheet representing a step in solving a mathematical problem, indicia on each sheet for describing the step, said sheets being selectively disposed in overlying relation with the problem disposed on the rearmost sheet and each succeeding step in the solution disposed on the preceding sheets, the forwardmost sheet having the final step thereon, said indicia being aligned and positioned so the entire mathematical problem and solution is illustrated when all the sheets are superimposed.

References Cited in the file of this patent

UNITED STATES PATENTS

| Number | Name | Date |
|---|---|---|
| 636,319 | Camp | Nov. 7, 1899 |
| 1,141,480 | Murayama | June 1, 1915 |
| 1,411,439 | Keller | Apr. 4, 1922 |
| 2,472,114 | Marder | June 7, 1949 |
| 2,501,902 | Howell | Mar. 28, 1950 |
| 2,519,922 | Newbury | Aug. 22, 1950 |

OTHER REFERENCES

"Structure," copyright 1941 by General Electric Co., Schenectady, N. Y.